United States Patent

Ward

[11] 4,196,158
[45] Apr. 1, 1980

[54] MANUFACTURE OF THIN WALLED PLASTICS MATERIAL ARTICLES

[76] Inventor: Peter Ward, c/o Plastona (John Waddington) Ltd. Wakefield Rd., Leeds LS10 3TP Yorkshire, England

[21] Appl. No.: 864,358

[22] Filed: Dec. 27, 1977

Related U.S. Application Data

[63] Continuation-in-part of Ser. No. 619,540, Oct. 3, 1975, abandoned.

[30] Foreign Application Priority Data

Oct. 3, 1974 [GB] United Kingdom ............... 42888/74

[51] Int. Cl.² ............................................. B29C 17/04
[52] U.S. Cl. ..................... 264/25; 264/544; 264/DIG. 65; 425/384
[58] Field of Search ..................... 264/90, 92, 93, 322, 264/DIG. 65, 25, 544, 547–551, 553, 554, 555; 425/384, 388; 432/8; 34/114

[56] References Cited

U.S. PATENT DOCUMENTS

| | | | |
|---|---|---|---|
| 2,888,787 | 6/1959 | Cloud | 425/388 X |
| 2,905,969 | 9/1959 | Gilbert et al. | 264/92 |
| 2,929,153 | 3/1960 | Fry, Jr. et al. | 34/114 X |
| 2,999,675 | 9/1961 | Erhardt, Jr. et al. | 432/8 X |
| 3,084,389 | 4/1963 | Doyle | 264/92 |
| 3,235,639 | 2/1966 | Knowles | 264/92 |
| 3,318,017 | 5/1967 | Smith, Jr. | 34/114 |
| 3,554,504 | 1/1971 | Parkes | 432/8 X |
| 3,667,889 | 6/1972 | Martelli | 264/92 X |

*Primary Examiner*—Jan H. Silbaugh
*Attorney, Agent, or Firm*—Fred Philpitt

[57] ABSTRACT

A plastics material web produced by extrusion or calendering and having a small thermoforming temperature range is located in two stages; a first stage in which radiant heaters heat the web approximately to thermoforming temperature and a second stage in which the temperature variations in the web due to thickness variations and heating variations are compensated by passing the web round rollers heated to the thermoforming temperature. The heated web is passed step by step to a thermoforming machine which operates cyclically on the web to form articles therein.

4 Claims, 1 Drawing Figure

U.S. Patent
Apr. 1, 1980
4,196,158
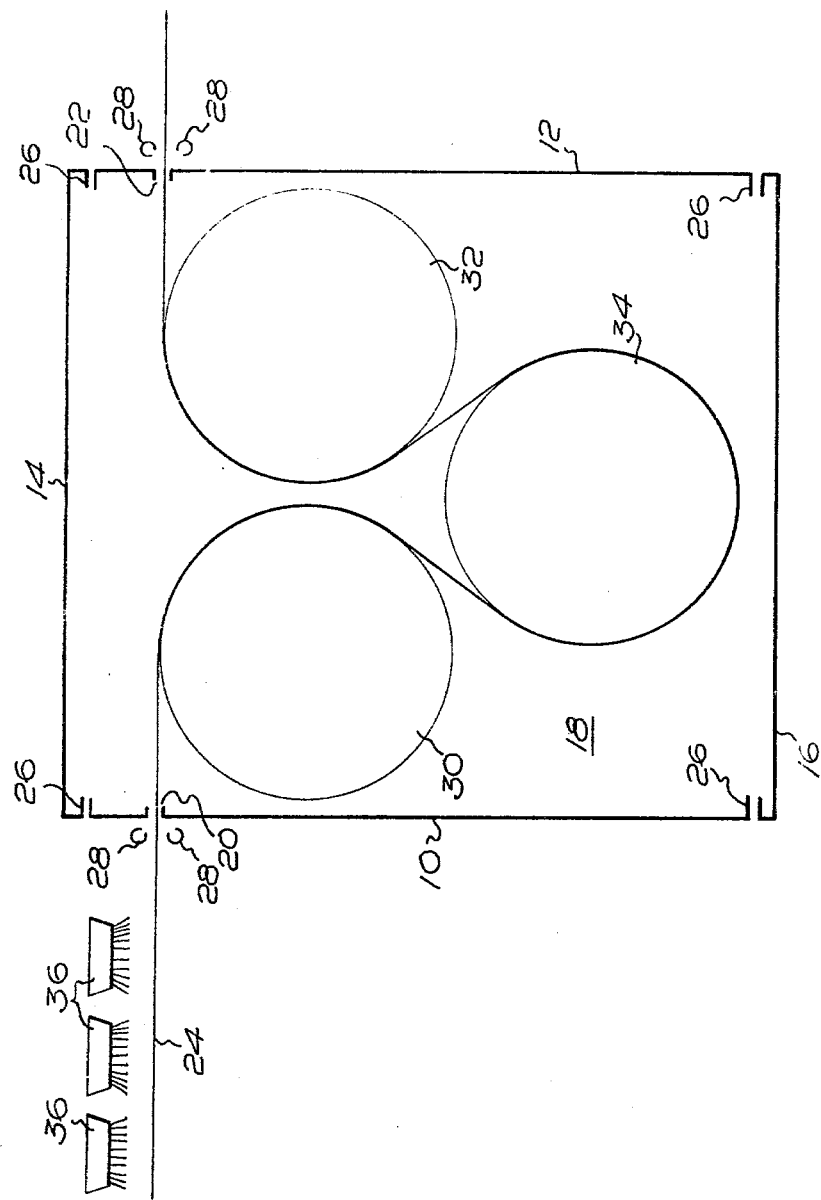

MANUFACTURE OF THIN WALLED PLASTICS MATERIAL ARTICLES

This application is a continuation-in-part of application Ser. No. 619,540 now abandoned.

BACKGROUND OF THE INVENTION

This invention relates to the manufacture of thin walled plastics material articles which are formed from web or sheet plastics materials (which may be laminates) which can only be satisfactorily formed at a thermoforming temperature lying in small temperature range.

Any suitable drawing or deep drawing technique such as vacuum forming, pressure forming, plug assist or mechanical forming or any combination of such techniques may be used in the forming of the articles, but in all cases the sheet material is heated to effect a degree of softening of the material so that it can be formed and therefore the forming of the articles will be referred to simply and generally as "thermoforming".

Thermoforming is of course will known and is widely practised, and there are many thermoformed articles in every day use in many countries of the world, such articles including domestic holloware and drinking cups.

Certain materials however and in particular polypropylene, polyethylene and expanded plastics sheet require to be thermoformed at very accurate temperatures in order to achieve high speed production and high quality products. Conventional methods of heating such as infra-red heaters do not alone provide sufficient accuracy of heating to achieve these desirable features even when the sheets being thermoformed are of uniform thickness which in commercial practice is not usually the case. More particularly, when plastics sheet material is produced by extrusion or calendering, it is virtually impossible to produce sheet which has an exact even thickness across the width of the sheet, because of local pressure and consistency differentials which exist at the extrusion die or calendar rolls. Thus, if a thickness gauge is therefore taken across the width of almost any extruded or calendered sheet it would reveal a series of hills and valleys. When one comes subsequently to heat such sheet or web so as to form articles therein by means of thermoforming, the said thickness variation causes considerable difficulties, especially with sheets of a plastics material such as polypropylene which has a very small temperature range from the state in which it is too rigid to be thermoformed and the temperature at which it is too fluent to be thermoformed because if, as is known conventionally, radiant heaters are used, the thin regions of the sheet will reach the thermoforming temperature before the thick regions and if sufficient heat is applied to raise the temperature of the thick regions to make such regions thermoformable, the thin regions may have reached a too fluent condition. In either case, products which are unsatisfactory result in the thermoforming process is that either fractures can occur because of the stress in unsufficiently softened thick regions or holes or wrinkles occur because of the thin regions being too soft, and fluent. Also, radiant heaters are usually elements of finite dimensions smaller than the width of the web and as the heat radiator in all directions therefrom and the web will be flat, it is impossible to heat all regions evenly using radiant heaters. This is because the heat has to travel different distances to reach the different parts of the sheet, in much the same way that it is impossible to illuminate a flat surface evenly using a filament lamp. However for the heating of the materials of the type to which the invention relates, were by means of a radiation process only, the plastics sheet would be much to unevenly heated for satisfactory thermoforming thereof.

Examples of sheet materials which are difficult to thermoform because of the fact that they have a small thermoforming temperature range are the polyolefins and in particular polypropylene in homopolymer or propylene-ethylene block copolymer form. Such materials have a thermoforming temperature range, i.e. the temperature range over which the material transforms from a too-rigid-to-thermoform sheet to an unthermoformable fluent mass is of the order 10°-12° C., which is not a high range considering that the softening point of say homopolymer polypropylene is of the order of 160° C. The sheet materials which are conventionally thermoformed into articles include for example polystyrene and polyvinylchloride and generally have a thermoforming temperature range of the order of 40° C., which is high and which matches the use of what might be termed coarse heating, such as infra red heaters acting alone.

DISCUSSION OF THE PRIOR ART

It is known, as stated above, to heat plastics sheet material prior to the thermoforming of same into articles, by using radiant heaters, as disclosed in U.S. Pat. Nos. 3,667,889 and 3,084,389. U.S. Pat. No. 3,667,889 makes no mention of the specific type of sheet material to be processed thereby, leading one to believe that the invention is concerned with the use of the conventionally used materials polystyrene and polyvinylchloride because the sheet material is shown as passing from the heating elements (which are radiant heaters) directly to the thermoforming part of the apparatus.

In U.S. Pat. No. 3,084,389 the invention is concerned with, in particular, thermoforming 1-olefin polymers which are materials having a high thermoforming temperature range and indeed in high softening point temperature. The materials can and are heated to a temperature above the softening point and are still thermoformable but with the materials of the present invention, if heating were effected to a temperature substantially higher than the softening point, the materials would be too fluent to be workable.

It is also known to position a thermoforming machine to receive plastics sheet material as it is being extruded from a sheet extruded, so that there is no requirement for heating the sheet between extrusion and thermoforming. This arrangement has several advantages, including that additional heating requirements are obviated and that the sheet extrusion will be more likely to be at the same temperature across its width, but it does have the disadvantages that control of the process must be watched very carefully because if the thermoforming machine stops suddenly there will be an uncontrolled delivery of soft extruded sheet resulting in wastage and requiring a considerable cleaning-up operation. In my experience, thermoformers tend to keep away from this type of operation because of the aforesaid disadvantage.

OBJECTIVE OF THE INVENTION

The present invention seeks to provide a method of heating which is useful for thermoforming sheets of those plastics materials which have a small thermoforming range for example of the order of 10°–12° C., and which materials include the so-called "filled" plastics material comprising plastics and inorganic particulate material.

BRIEF SUMMARY OF THE INVENTION

According to the present invention the heating of the web stock, prior to thermoforming is effected in two stages, namely a first stage in which radiant heating means heats the web approximately optimum thermoforming temperature and then temperature variations in the web which arise because of thickness and heating variations are compensated by passing the heated web round heated roller means heated to said optimum temperature. The process is effected on a step by step basis with dwell times between steps to enable a cyclically operable thermoforming machine to form articles in the heated web.

Contacting the web with heated roller means ensures even heating of the web across its width, and the web can at no point reach a temperature which is greater than that of the roller means.

The construction of the articles is of course immaterial to this invention.

The roller means may be contained in a chamber containing a heated gaseous and/or vapour environment, and the web preferably travels into and out of the chamber in a horizontal direction and in the same plane, and the roller means may comprise three rollers lying with their axes horizontal, two of the rollers lying above the third roller and disposed symmetrically relative to the vertical plane containing the axis of the third roller. Each roller is preferably heated by circulating hot oil therethrough.

The web travels over and round one of the upper rollers, round the lower roller and round and over the other upper roller, so as to define a path having said vertical plane as an axis of symmetry. The rollers preferably are of such size and are so disposed that the web, in travelling through the chamber, has equal contact with the rollers on each side of the sheet.

There may be inlet means and outlet means by which the gaseous and/or vapour medium can be injected into and removed from the chamber to provide the said environment. The temperature of the rollers and the gaseous and/or vapour medium preferably is accurately controlled, so that the web will be heated to an even, accurate temperature, which preferably is such that the web is ready for thermoforming.

The temperature of the rollers and gaseous and/or vapour medium will preferably be thermostatically controlled in order to ensure that the web is maintained at the desired temperature. The minimum length of time which the sheet must be in the chamber to reach the desired temperature will depend upon the dimensions of the sheet but in any case this time can be adjusted to suit the material being heated. There is no maximum heating time as the temperature of the web cannot get higher than the chamber temperature.

Articles, such as domestic holloware, formed from polypropylene heated in this manner can be reliably produced in large quantities and, taking large numbers on average, they exhibit an excellent surface finish, toughness and clarity which are better than those characteristics in polypropylene articles thermoformed after conventional heating. Although the web is heated by radiant heat initially, roller contact provides the beneficial effect that even temperature distribution can be achieved.

The invention thus provides an effective method whereby plastics material in web form can be heated evenly, enabling the effective use of plastics materials such as the polyolefins, e.g polypropylene, for thermoformed articles produced in large numbers; the cycle time can be made very short and in many cases a cheaper yet superior article can be produced.

The invention also provides articles produced according to the method as aforesaid.

Also according to the invention there is provided apparatus for use in the method as aforesaid comprising radiant heating means for heating the web, roller means around which the web can be passed after passing the radiant heating means, means whereby the roller means can be heated to a predetermined temperature.

An embodiment of the invention will now be described, by way of example, with reference to the accompanying diagrammatic drawing, of which the single FIGURE is a sectional side elevation of a heating chamber.

Referring to the drawing, the heating chamber is defined by a cabinet having front and rear walls 10 and 12, top and bottom walls 14 and 16, and two side walls, of which only side wall 18 is shown, as the FIGURE is a sectional elevation. The front wall at its top portion is provided with an entry slot 20, whilst the rear wall 12 is provided with an exit slot 22. These slots 20 and 22 are in horizontal alignment and enable the passage of a continuous thermoformable web 24, of a plastics material having a small temperature range over which it can be thermoformed by drawing such as a web of polypropylene, to enter the chamber through slot 20 and exit from the chamber through slot 22.

The front wall 10 and the rear wall 12 are also provided with inlets 26 for gaseous and/or vapour heating medium. In this example, the heating medium is air. In use, heated air is continuously inserted into the chamber through these inlets 26 and is extracted by extraction pipes 28 which are located, as shown, above and below the entry slot 20 and above and below the exit slot 22.

Inside the chamber, there are three heated rollers 30, 32 and 34. These rollers are disposed with their axis parallel and horizontal, and the rollers 30 and 32 are disposed at a higher level than the roller 34. The rollers 30 and 32 are in fact symmetrically disposed about a vertical plane passing through the axis of roller 34. These rollers are heated by circulating heated oil through the hollow interiors thereof, but their peripheral surfaces are metallic for good conduction of heat from the roller surfaces to the web 24, in contact therewith. The web 24, as explained herein, will have thickness variations due to the manufacture of same by extrusion or calendering and the heating by radiant heaters 36 is to heat the web approximately to thermoforming temperature. However, because of said thickness variations, in some regions the web will be above thermoforming temperature, whereas some regions will be below such thermoforming temperature the web is not suitable for thermoforming in this condition. Because of this, the web 24 after passing infra-red pre-heaters 36 travels, as shown, over roller 30, round roller 34 and then over roller 32. The web eventually leaves via exit slot 22 and it will be seen that the entering stretch of web and the leaving stretch in relation to the chamber, are disposed in the same horizontal plane.

The temperature of the rollers and the envirionment in the chamber is maintained within accurate limits, the regions of a higher than optimum temperature being cooled by conduction to and contend with the rollers, whereas the regions, at a lower than optimum temperature are heated, to ensure that the web 24 is heated evenly to the optimum temperature for thermoforming, and is passed directly from exit 22 whilst still hot to a thermoforming machine which in this example is of conventional design and in which the articles are produced in the web 24 and then removed therefrom. The temperature of the rollers will be controlled by the circulation both of the environment of the chamber, and the oil of the heating rollers, and suitable thermostats will be employed to maintain these temperatures within accurate limits. For example the air which is injected through inlets 26 may be at 160° centigrade for polypropylene sheet and the rollers 30, 32 and 34 would be maintained at a similar temperature. Some regions of the web before passing to the heated rollers may be at 160° C.+5° C., whilst other regions may be at 160° C.−5° C.

The roller sizes and disposition are preferably selected so that as the web 24 passes through the apparatus there will be the same amount of contact between roller and web, at each side of the web at all times, and the rollers 30, 34 and 32 in that order may be driven at slightly higher speeds, in order to compensate for any lengthwise expansion of the sheet 24 which may take place during contact with the rollers and to ensure that the web 24 remains in intimate contact with the rollers. Furthermore, it is possible to have the rollers 30, 34 and 32 so positioned as to define nips between rollers 30 and 34 on the one hand, and rollers 34 and 32 on the other hand in order to effect or assist the feeding of the web through the chamber.

The web is fed by suitable means step by step to the thermoforming machine, which is cyclically operable, and there are dwell times between steps, during which dwell times the thermoforming machine operates to form articles in the web.

Whilst the preferred construction of apparatus has been described, it is to be appreciated that modifications may be made without parting from the scope of the invention. For example, it would be possible to provide an apparatus in which only two rollers are provided, with the web travelling in "S" formation round these rows and having equal web to roller contact on each side of the web. Furthermore, the chamber may contain suitable baffling in order to ensure that the hot air which is being injected into chamber will tend to be directed towards the rollers.

Also, it is not necessary that the rollers be contained in a cabinet containing a temperature controlled environment, because heat loss by conduction through air is minimal compared to the conduction of heat as between rollers and web.

What we claim is:

1. A method for the manufacture of thin walled articles from plastics material having a small temperature range over which the plastics material can be formed by thermoforming, wherein a continuous web of the plastics material is heated by radiation heating means approximately to optimum thermoforming temperature, and then temperature variations which arise because of thickness and heating variations in the web are compensated for by passing the web in contact with and round roller means heated to said optimum temperature to provide even temperature distribution in the web, and the thus heated web whilst still hot is fed step by step with dwell times between steps to a thermoforming machine whereat articles are thermoformed therein during said dwell times.

2. A method according to claim 1, wherein the plastics material web is a polyolefin plastics material.

3. A method according to claim 1, wherein the web is passed round several rollers forming said roller means and said rollers are of such size and are so disposed that the web in travelling round said rollers, has equal contact with the rollers on each side of the sheet.

4. A method according to claim 1, wherein the roller means are contained in a chamber containing a heated gaseous and/or vapour environment, and the web travels into and out of the chamber in a horizontal direction and in the same plane and the temperature of the gaseous and/or vapour environment is thermostatically controlled so that it is maintained at a constant preselected temperature.

* * * * *